United States Patent
Lin

Patent Number: 5,285,650
Date of Patent: Feb. 15, 1994

[54] AUTOMOBILE CONDENSER ELECTRIC FAN CONTROLLER

[76] Inventor: Che-Tzu Lin, 3F., No. 8-1, Alley 28, Lane 315, Sec. 2, Shih Pai Road, Pei Tou District, Taipei, Taiwan

[21] Appl. No.: 97,218

[22] Filed: Jul. 27, 1993

[51] Int. Cl.[5] .............................................. B60H 1/32
[52] U.S. Cl. ........................................ 62/133; 62/184
[58] Field of Search .................................. 62/133, 184

[56] References Cited

U.S. PATENT DOCUMENTS

| | | | |
|---|---|---|---|
| 4,858,676 | 8/1989 | Bolfik et al. | 62/133 |
| 4,933,614 | 6/1990 | Kawata | 62/133 |
| 5,022,232 | 6/1991 | Sakamoto et al. | 62/133 |
| 5,167,127 | 12/1992 | Ohtsu | 62/133 |
| 5,199,272 | 4/1993 | Yamanaka et al. | 62/133 |

Primary Examiner—John T. Kwon
Attorney, Agent, or Firm—Varndell Legal Group

[57] ABSTRACT

An automobile condenser electric fan controller, which includes a high pass filter, an inverted comparator, and a relay, the inverted comparator comparing the signal obtained from the high pass filter with a reference DC level signal made according to predetermined critical speed and then providing a high potential or low potential output according to the comparison result, whereby the relay is controlled to turn on the automobile's condenser electric fan as the output of the inverted comparator and the output of the automobile's compressor both are at high potential; the relay is controlled to turn off the automobile's condenser electric fan as the output of the inverted comparator and the output of the automobile's compressor both are at low potential, or either one is at high potential while the other is at low potential.

3 Claims, 5 Drawing Sheets

AUTOMOBILE CONDENSER ELECTRIC FAN CONTROLLER

BACKGROUND AND SUMMARY OF THE INVENTION

The present invention relates to an automobile condenser electric fan controller adapted to be installed in an automobile for controlling the operation of the automobile's condenser electric fan, which turns off the condenser electric fan automatically as the speed of the automobile surpasses a predetermined critical speed, or turns on the condenser electric fan as the speed of the automobile drops below the critical speed.

Various methods have been disclosed for controlling the operation of the condenser electric fan of an automobile. These methods are still not satisfactory in functions. Drawbacks of these methods are outlined hereinafter respectively.

I. Radiator temperature controlled control method to control the operation of the condenser electric fan according to the temperature of the radiator: As the vehicle is running at a low speed, the performance of the air conditioner and the effect of heat dissipation are getting worse, and the condenser and the evaporator may be damaged easily due to the compression of high pressure.

II. Synchro control methods to synchronously turn on the condenser electric fan as the compressor is started: As the vehicle is running at a high speed, intake current of air is blocked by the condenser electric fan as the condenser electric fan keeps operating, and therefore much energy is wasted.

III. Freon temperature (pressure) controlled control methods to control the operation of the condenser electric fan according to the temperature (pressure) detected by a temperature sensor (pressure sensor). As the vehicle is running at a low speed, the temperature (or pressure) of the freon may be still at a low level and therefore much waiting time is needed before starting the condenser electric fan; if the temperature (or pressure) of the freon has already reached the critical level as the vehicle is running at a low speed, more time and more energy are needed to reduce the temperature (or pressure) by turning on the condenser electric fan, and therefore the generator shall have to work more hard. Further, the condenser and the evaporator may be damaged easily due to the compression of high pressure as the vehicle is running at a low speed. As the vehicle is running at a high speed, the compressor is operated at a high speed to increase the pressure of the freon, and therefore much energy will be consumed to turn off the condenser electric fan.

VI. Vehicle internal temperature controlled control method to turn on/off the condenser electric fan according to the internal temperature of the vehicle. As the vehicle is running from a high speed to a low speed, the condenser electric fan will be turned on only after the internal temperature of the vehicle reaches the critical temperature, therefore there is a time delay, and the driver and the passengers may feel hot before the condenser electric fan is turned on; If the vehicle which is radiated by the direct sunlight for a longth of time is running at a high speed, the condenser electric fan will be turned on to produce a current of air for cooling because the internal temperature of the vehicle is high, therefore intake current of air will be blocked by the condenser electric fan, and much energy will be wasted in turning on the condenser electric fan.

The present invention eliminates the aforesaid drawbacks. It is therefore the principal object of the present invention to provide an automobile condenser electric fan controller for controlling the operation of the condenser electric fan of an automobile automatically according to the speed of the automobile. The control is executed by setting a critical speed, and then detecting the speed of the automobile. As the speed of the automobile surpasses the critical speed, the condenser electric fan is turned off automatically; as the speed of the automobile drops below the critical speed, the condenser electric fan is turned on automatically. Therefore, the present invention saves much energy. Because the freon is constantly maintained at low temperature and low pressure, the performance of the air conditioner of the automobile is maintained at a good condition, and the service life of the condenser and the evaporator is greatly extended.

DETAILED DESCRIPTION OF THE PREFERRED EMBODIMENT

Figure 1:
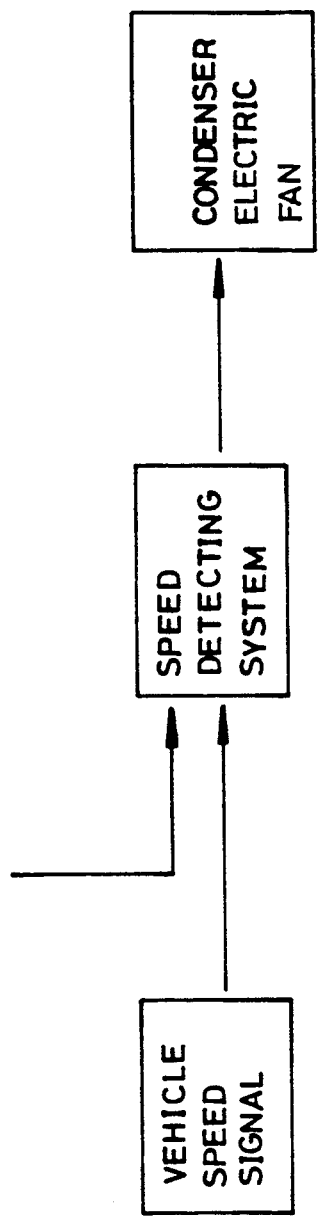
FIG. 1 is a block diagram according to the present invention, showing a speed detecting system operated to control a condenser electric fan according to detected vehicle speed.
Figure 2:
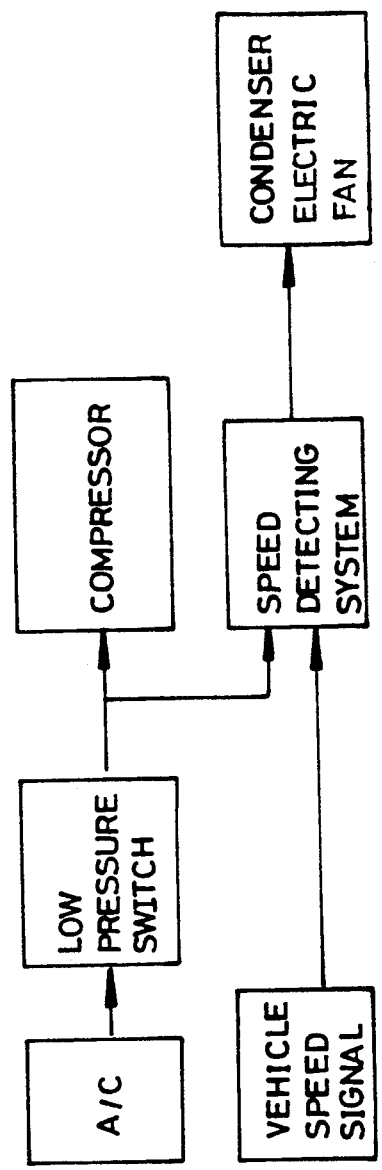
FIG. 2 is a block diagram showing the application of the present invention in controlling the operation of a vehicle's condenser electric fan.
Figure 3:
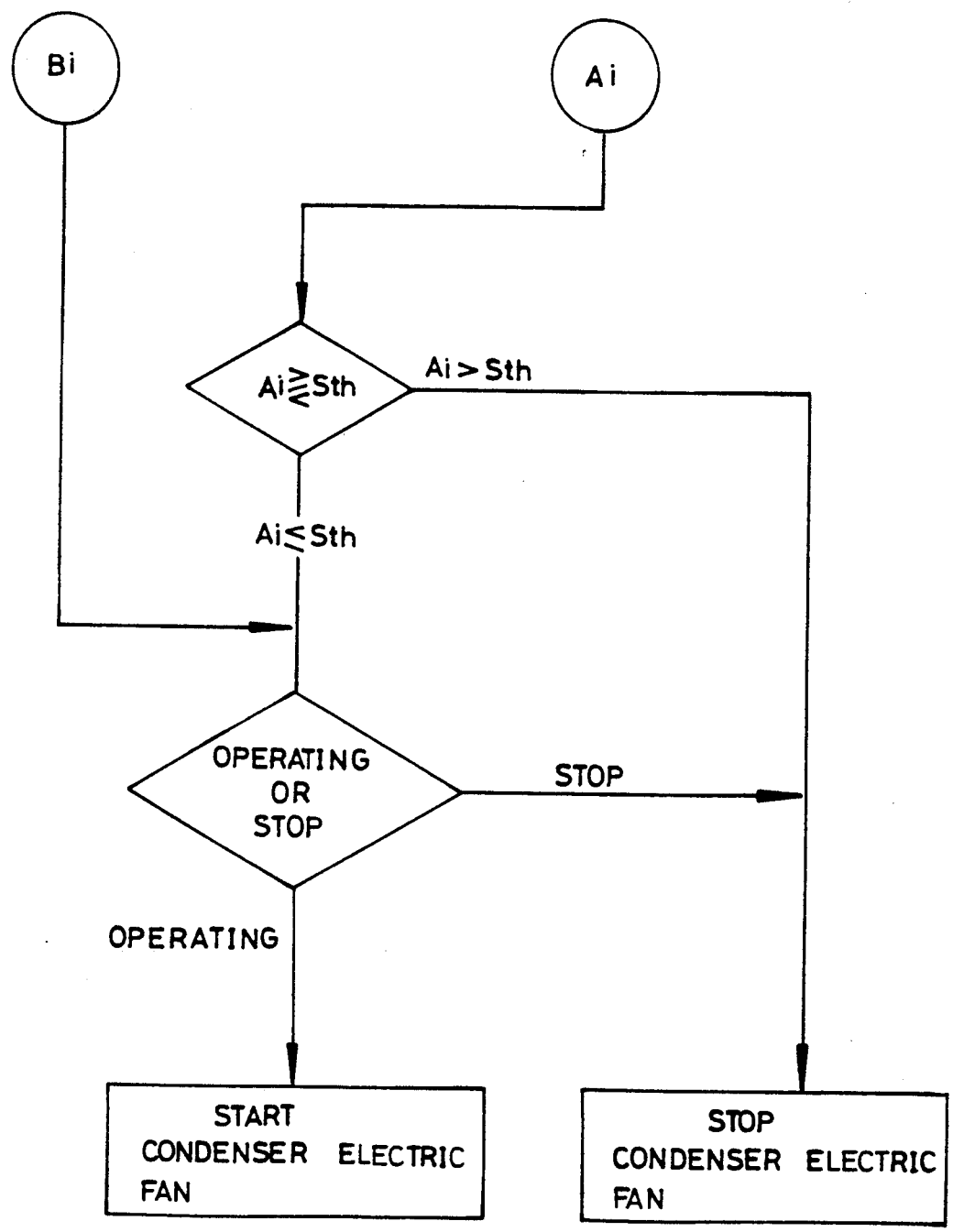
FIG. 3 is a flow chart showing the operation of the preferred embodiment of the present invention.
Figure 4:
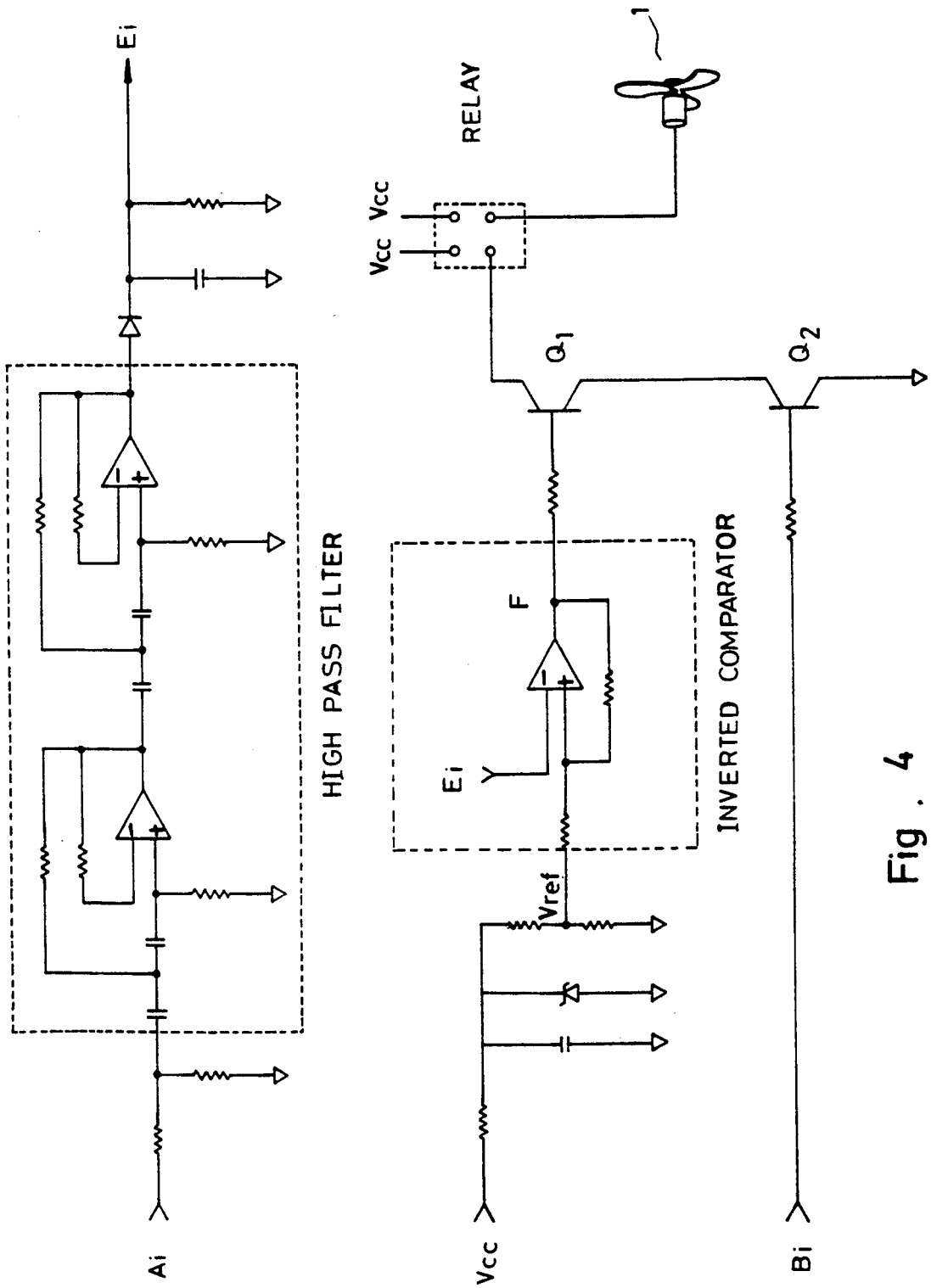
FIG. 4 is a circuit diagram according to the preferred embodiment of the present invention.

Referring to FIGS. 1, 2, 3 and 4, an automobile condenser electric fan controller, as referenced by 1, is adapted to be installed inside an automobile for controlling the operation of the automobile's condenser electric fan according to the speed of the automobile. Before the operation of the automobile condenser electric fan controller 1, a critical speed is predetermined. The condenser electric fan is turned off as the speed of the automobile reaches the predetermined critical speed, or turned on as the speed of the automobile drops below the predetermined critical speed.

The controller comprises a working voltage source signal line connected to the battery (about 12 V) of the automobile, a ground wire, a speed signal line connected in parallel to the automobile's speedometer to provide a speed signal $A_i$, a compressor signal line connected in parallel to the low pressure switch of the automobile's compressor to provide a compressor operating signal $B_i$, which is at high potential as the compressor is "ON" or at low potential as the compressor is "OFF", an output control relay signal line, a high pass filter to pick up the signal surpassing the predetermined critical speed reference signal $S_{th}$ and then to convert the obtained signal into a correspondent DC level $E_i$, an inverted comparator to compare the DC level $E_i$ thus obtained from the high pass filter with the reference DC level $V_{ref}$ and then provide an output F according to the comparison result. The output F of the inverted comparator is at high potential as the DC level $E_i$ is smaller than the reference DC level $V_{ref}$, or at low potential as the DC level Ei is bigger than or equal to the reference DC level Vref. As the output F and the compressor operating signal Bi both are at high potential, it indicates that the compressor is in operation, and the speed of the automobile is below the predetermined critical speed, and therefore the transistors Q1 and Q2 are electrically connected to turn on the condenser electric fan via the relay. As the output F and the compressor operating signal Bi both are at low potential, or either one is at high potential while the other is at low potential, it means that the speed of the automobile surpassed the predetermined critical speed, and therefore the transistors Q1 and Q2 are electrically disconnected to turn off the condenser electric fan via the relay. As the automobile is running at a high speed, a current of outside air is continuously induced into the automobile for cooling, and therefore it is not necessary to turn on the condenser electric fan. (If the condenser electric fan is not turned off as the automobile is running at a high speed, the running condenser electric fan will block the intake current of air.)

The aforesaid critical speed is preferably set at about 50 km/hr. At this speed, intake current of air is sufficient for cooling. If the wind velocity of the intake current of air surpasses the wind velocity of the current of air produced by the condenser electric fan, the condenser electric fan must be turned off to let the intake current of air pass through for cooling. If the condenser electric fan is not turned off as the wind velocity of the intake current of air surpasses the wind velocity of the current of air produced by the condenser electric fan, the intake current of air will be blocked by the condenser electric fan. Therefore, turning off the condenser electric fan adequately greatly save power supply without affecting the cooling effect of the condenser.

Further, a low pass filter may be used to replacing the aforesaid high pass filter.

Figure 5:
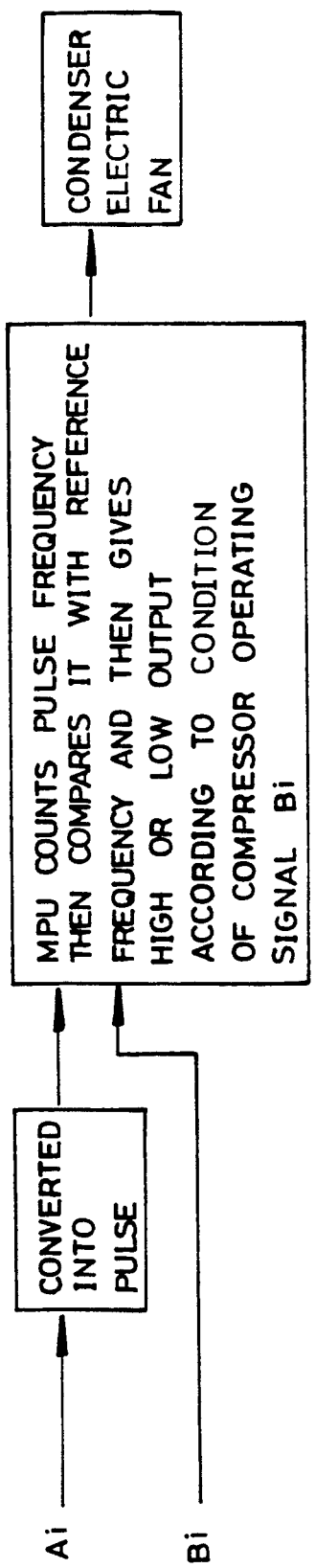
FIG. 5 is a block diagram showing the application of an alternate form of the present invention.

Referring to FIG. 5, the speed signal Ai may be directly converted into a correspondent pulse and then sent to a microprocessor unit for processing. The microprocessor unit counts the frequency of the pulse, then compares the frequency of the pulse with the frequency of the predetermined critical speed, and then sends a high potential output or low potential output for controlling the operation of the condenser electric fan according to the potential of the compressor operating signal Bi.

I claim:

1. An automobile condenser electric fan controller installed in an automobile for automatically turning off a condenser electric fan of said automobile when a speed of said automobile surpasses a predetermined critical speed and for automatically turning on said condenser electric fan when said speed of said automobile below said predetermined critical speed, said controller comprising a working voltage source signal line connected to a battery of said automobile, a ground wire, a speed signal line connected in parallel to a speedometer of said automobile for providing a speed signal Ai, a compressor signal line connected in parallel to a low pressure switch of a compressor of said automobile for providing a compressor operating signal Bi having a high potential when said compressor is operating and a low potential when said compressor is not operating, an output control relay signal line, a filter for receiving a signal surpassing the predetermined critical speed reference signal Sth and converting the received signal into a corresponding DC level Ei, an inverted comparator for comparing the DC level Ei obtained from said filter with a reference DC level Vref and providing an output F according to the comparison result, said output F of said inverted comparator being at high potential when said DC level Ei is lower than said reference DC level Vref and being at low potential when said DC level Ei is higher than or equal to said reference DC level Vref, a first transistor connected between said inverted comparator and said output control relay signal line, and a second transistor connected between said first transistor and said compressor signal line, whereby said first and second transistor are electrically connected for turning on said condenser electric fan via said output control relay signal line when said output F and said compressor operating signal Bi both are at high potential, and said first and second transistor are electrically disconnected for turning off said condenser electric fan via said output control relay signal line when at least one of said output F and said compressor operating signal Bi is at low potential.

2. The automobile condenser electric fan controller of claim 1, wherein said critical speed is 50 km/hr and said reference DC level Vref is set based said critical speed.

3. The automobile condenser electric fan controller of claim 1, which further comprises a converter for directly converting said speed signal Ai into a corresponding pulse signal, and a microprocessor unit for counting a frequency of said pulse signal, comparing the frequency of said pulse signal with a frequency of said predetermined critical speed and providing one of a high potential output and a low potential output based upon the comparison for controlling operation of said condenser electric fan according to the potential of said compressor operating signal Bi.

* * * * *